United States Patent

McCoy

[11] Patent Number: 6,014,609
[45] Date of Patent: Jan. 11, 2000

[54] ACOUSTIC REFLECTION CHART RECORDER

[76] Inventor: James N. McCoy, 2210 Midwestern Pkwy., Wichcita Falls, Tex. 76308

[21] Appl. No.: 09/053,564

[22] Filed: Apr. 1, 1998

[51] Int. Cl.[7] ................................................ G01V 1/40
[52] U.S. Cl. ............................................................. 702/6
[58] Field of Search ............................ 702/6, 9, 33, 39, 702/66, 67, 69, 159, 166; 166/64, 255.1, 250.03; 181/105, 106; 367/35

[56] References Cited

U.S. PATENT DOCUMENTS

| | | | |
|---|---|---|---|
| 4,658,383 | 4/1987 | Zimmer | 367/29 |
| 4,887,299 | 12/1989 | Cummins et al. | 381/68.4 |
| 4,893,286 | 1/1990 | Cobb | 367/35 |
| 4,918,669 | 4/1990 | Chemali et al. | 367/27 |
| 5,157,348 | 10/1992 | Deveau | 330/279 |
| 5,267,322 | 11/1993 | Smith et al. | 381/107 |
| 5,291,558 | 3/1994 | Ross | 381/107 |
| 5,329,243 | 7/1994 | Tay | 330/136 |

OTHER PUBLICATIONS

Keystone Development Corporation, brochure for "Sonolog Acoustic Well Sounder for Model D–6C2 and Model LD–6B2".

Echometer Company, "Echometer Operating Manual Covers Compact Gas Gun".

*Primary Examiner*—Donald E. McElheny, Jr.
*Attorney, Agent, or Firm*—Sidley & Austin

[57] ABSTRACT

An acoustic reflection instrument detects background noise and reflections present in a well bore that extends into the earth. The instrument includes a shot break channel with a fixed gain amplifier, a collars channel with a variable gain amplifier and a liquid level channel with a variable gain amplifier. The outputs of all these amplifiers are input to an analog-to-digital converter which selectively provides digital output signals to a central processing unit which in turn processes the received data and prints it on a strip chart with two channels, one for principally showing reflections from collars and the other channel for principally showing the reflection from the liquid surface. Background noise is measured for a predetermined time to set a gain level for the amplitude of the noise to appear on the strip chart record. After the acoustic pulse is detected by the instrument, the gain of the collars channel is adjusted, first with fixed values and then followed by variable values based upon the peak value within a sample of preceding output data samples. However, the maximum gain of the collars channel amplifier is limited to the gain setting determined for measurement of the background noise. The amplification can also be performed in software. The output signal is printed on a strip chart.

23 Claims, 6 Drawing Sheets

ACOUSTIC REFLECTION CHART RECORDER

BACKGROUND OF THE INVENTION

In the production of petroleum from oil wells, it is important to know the location of the liquid surface of the fluid in a well. This is particularly important in wells which must be pumped and which use a reciprocating rod that extends through the tubing. The information can be used to determine the maximum production rate of fluid from the well as well as to detect problems in the downhole pump and related equipment.

A principal technique for measuring the distance from the earth surface to the surface of the fluid has been echo ranging by the transmission of acoustic pulses down the well bore. This is generally done by use of an instrument called a "gun" which produces an acoustic pulse by a sudden expansion of gas or by the firing of a cartridge. An instrument is used which has a microphone that detects the acoustic activity within the well bore and is able to measure reflections from the tubing collars as well as a reflection from the liquid surface. By counting the reflections from the tubing collars, and knowing the length of each tubing joint, it is possible to calculate the depth to the fluid surface.

Although instruments of this type have been in use for many years, there is still a need for apparatus and procedures to better collect, analyze and display the information as well as to improve the ease of use of the instrument by the operator.

SUMMARY OF THE INVENTION

A selected embodiment of the present invention is a method for collecting acoustic data which is produced in a well bore in response to the transmission of an acoustic pulse down the well bore in the earth. This is done by monitoring the acoustic environment within the borehole to produce a detection signal. This detection signal is amplified to produce an output signal. Prior to generation of the acoustic pulse, the background noise in the well bore is monitored as the detection signal and a gain is selected for the amplification to produce an output signal that has a first predetermined amplitude, typically a low level compared to full scale. Next, the instrument awaits the occurrence of the acoustic pulse and detects the occurrence of the pulse. After the pulse has been detected, a process is carried out repeatedly to detect the amplitude of the output signal and increase the gain when the detected amplitude of the output signal is less than a predetermined limit, and decreasing the gain of the variable gain amplifier when the detected amplitude of the output signal is more than a second predetermined limit. But, in no circumstance is the gain allowed to exceed the gain value established by monitoring the background noise in the borehole.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
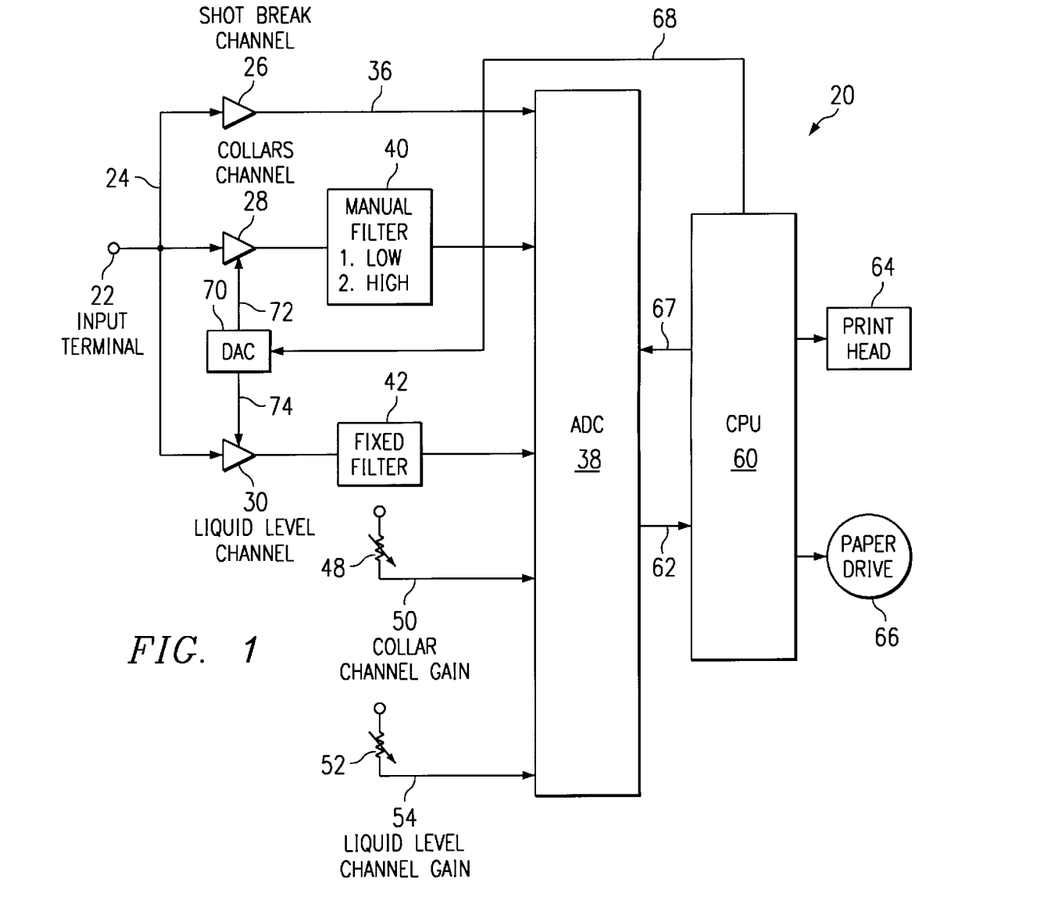
FIG. 1 is a block diagram of a data acquisition and recording instrument in accordance with the present invention.

A block diagram of a data acquisition instrument 20 in accordance with the present invention is illustrated in FIG. 1. An input terminal 22 is connected to a microphone that is acoustically coupled to the well bore of a well, such as shown in U.S. Pat. No. 5,200,894 (entitled "Method For Processing Echo Sounding Data Collected From Boreholes In The Earth", issued Apr. 6, 1993) which is incorporated herein by reference. The microphone within the well bore monitors the acoustic environment within the well bore and produces a signal that is transferred to input terminal 22. The input signal is transmitted through a line 24 to the input of a fixed gain amplifier 26 and to the inputs of variable gain amplifiers 28 and 30. The output signal from the amplifier 26 is transmitted through a line 36 to an analog-to-digital converter (ADC) 38. The signal line that includes the amplifier 26 is termed the "shot break" channel.

The output from variable gain amplifier 28 is transmitted through a filter 40 to another input of the converter 38. The filter 40 has two manual settings, one for low frequency collar reflections in the range of 10 to 25 hz and a second setting for higher frequency collar reflections in the range of 10 to 100 hz. The purpose of the "collars channel" is to produce a strip chart record which best shows the presence of collar reflections. The collar reflections from collars deep in the well have lower frequency energy than collar reflections from higher in the well.

The output of amplifier 30 is passed through a fixed filter 42, having a 10 hz low pass characteristic, to the converter 38. This channel produces the liquid level strip chart record.

The signal path which includes the amplifier 28 is termed the "collars" channel and the signal path which includes the amplifier 30 is termed the "liquid level" channel.

The collars channel emphasizes collar reflections and the liquid level channel emphasizes the reflection from the liquid surface.

A collar gain potentiometer 48 is connected through a collar channel gain line 50 to an input of the converter 38. A liquid level gain potentiometer 52 is coupled through a line 54 to another input of the converter 38.

A central processing unit 60 receives a digital output through a line 62 from the converter 38. The CPU 60 drives a print head 64 and a paper drive 66. The CPU 60 sends control signals through a line 67 to the converter 38.

Figure 5:
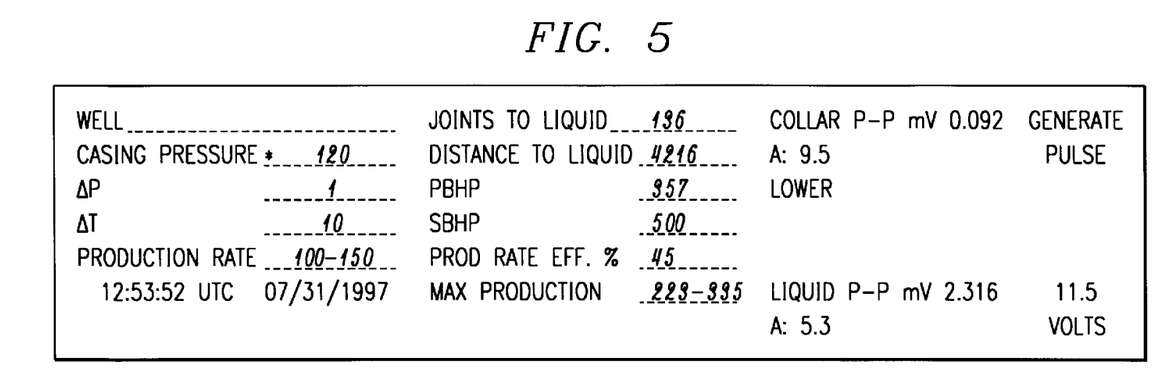
FIG. 5 is a portion of a strip chart record indicating parameters which have been labeled for a particular well evaluation.
Figure 6:
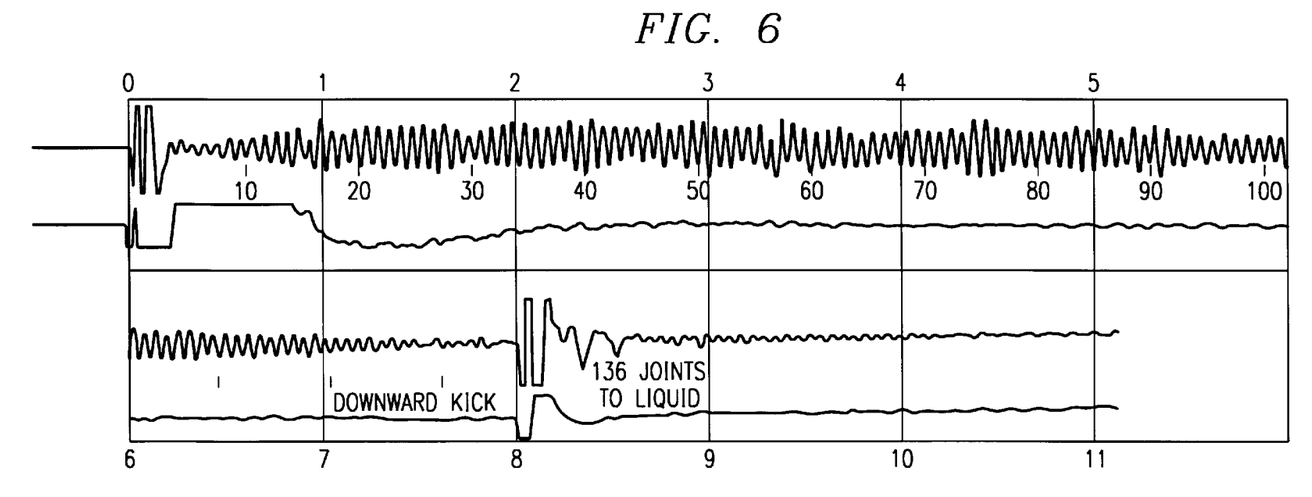
FIG. 6 is a dual strip chart record produced in accordance with the present invention showing collar reflections in a first channel and a liquid level reflection in a second channel.

In operation, the instrument 20 monitors the acoustic environment within a well bore and produces a dual channel strip chart record which is printed by operation of the print head 64. An example of the strip chart record is shown in FIGS. 5 and 6.

The CPU 60 sends control signals through a line 68 to a dual channel digital-to-analog converter 70. The converter 70 produces a first analog output which is transmitted through a line 72 for controlling the gain of amplifier 28. Converter 70 produces a second analog signal which is transmitted through line 74 for controlling the gain of amplifier 30.

The converter 38, which is an 8 channel 10 bit converter, is preferably a model ADC10158 manufactured by National Semiconductor. The CPU 60 can be based on an Intel Model 801C188EB microprocessor.

The CPU samples data on the collars and liquid level channels at the rate of approximately 500 samples per second.

Figure 2:
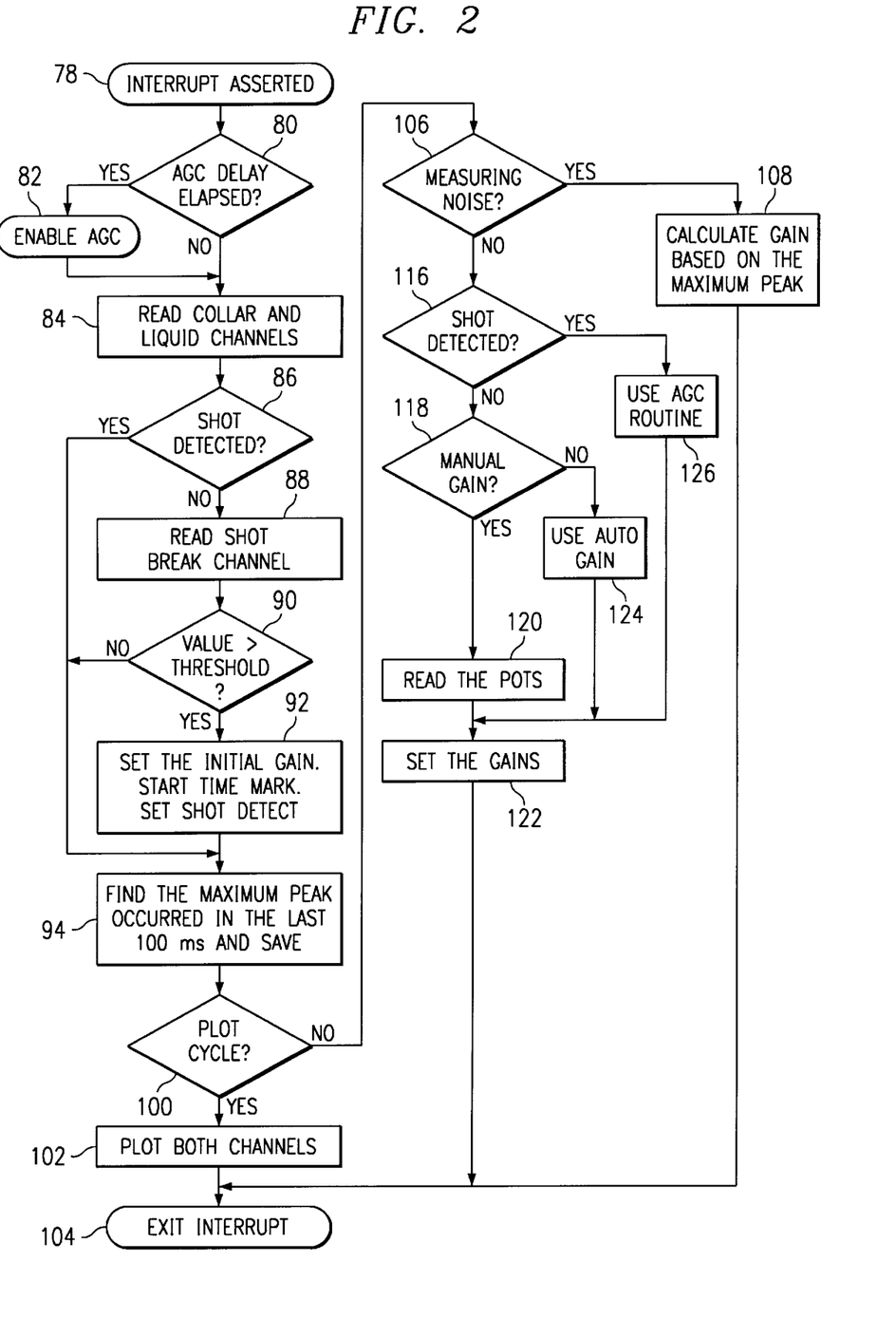
FIG. 2 is a flow diagram illustrating the processing procedures and operation of the present invention.

A flow diagram illustrating the operation of the instrument 20 is shown in FIG. 2. This describes the operations carried out by the CPU 60. The CPU 60 works on an interrupt driven basis with an interrupt being produced each one millisecond (ms) by a clock. The processing is begun with the interrupt asserted block 78. The speed of the CPU 60 and the converter 38 is such that the complete operation shown in FIG. 2 will be completed in almost all cases before the next interrupt occurs.

Figure 4:
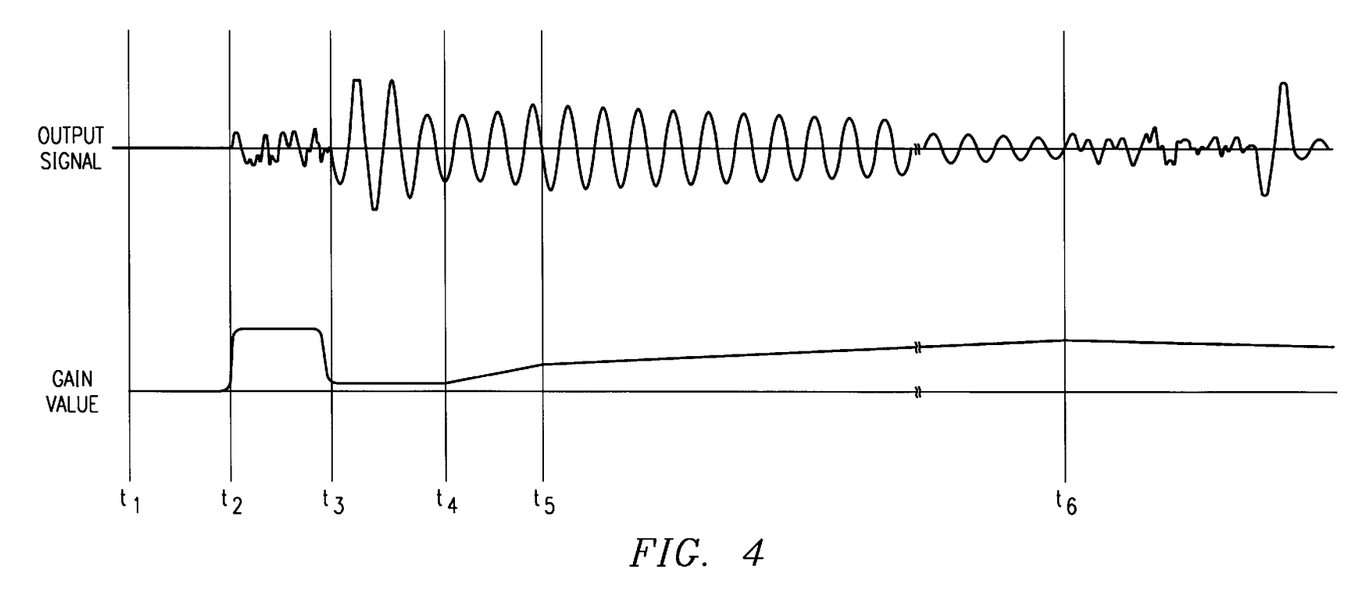
FIG. 4 is an illustration showing an amplifier output signal and a gain value plot for a corresponding variable gain amplifier.

The operations shown in FIG. 2 are described in reference to the charts in FIG. 4. The output signal in the upper chart in FIG. 4 represents the output of the variable gain amplifier 28 for the collars channel. The gain value represented in the lower chart represents the variable gain applied to the amplifier 28 from the DAC 70. The greater the amplitude of this signal, the greater the gain of amplifier 28.

The output signal shown in FIG. 4, during the time period of $t_1$ to $t_2$ (approximately 2 seconds) represents monitoring the background noise within the borehole. During this time the required gain ($G_{max}$) is determined to produce a reflected noise amplitude on the strip chart. During period $t_2$ to $t_3$ the desired low level (⅛" on 1" strip chart) is recorded with the indicated gain value.

An acoustic pulse is generated by a gun, such as shown in U.S. Pat. Nos. 4,408,676; 4,637,463 or 4,646,871 and this pulse is transmitted down the borehole of the well. This pulse is shown in the output signal during the time between $t_3$ and $t_4$. Reflections from tubing collars in the borehole are shown as periodic cycles during the intervals from $t_4$ to $t_6$. The signal after $t_6$ represents background noise until a high level signal is shown representing a reflection from the liquid surface deep within the well.

The time period between $t_3$ and $t_5$ is the timed gain control. Returning to FIG. 2, a question block 80 inquires to determine if this time period has been completed. If the AGC delay time period has elapsed, the YES exit is taken to block 82 wherein the AGC operation represented by the time period from $t_5$ through $t_6$ is begun. If the AGC delay time has not elapsed, the NO exit is taken from block 80 to a block 84 wherein the CPU 60 carries out the function of reading the collars channel for data and reading the liquid level channel for data. This data is temporarily stored in the CPU 60.

Following block 84, entry is made to question block 86 which makes an inquiry to determine if the shot has been detected. The shot is detected by operation of the shot break channel which includes amplifier 26. The output of this amplifier is transmitted through a line 36 to the ADC 38 which digitizes the signal.

If the shot has not been detected, the NO exit is taken to a block 88. In this block, the CPU 60 reads the shot break channel to determine the amplitude of the signal. Next, question block 90 is entered to determine if this amplitude exceeds a predetermined threshold. If it does not exceed the threshold, the NO exit is taken meaning that the shot has still not been detected. If the shot break signal amplitude does exceed the threshold, the YES exit is taken from block 90 to set an initial gain for the amplifier 28, start the time mark as indicated by $t_3$ and set a shot detected flag.

Both the NO exit from block 90 and the exit from block 92 lead to a block 94 in which the CPU 60 examines the output data for the collars channel for the last 100 ms and determines the maximum peak amplitude that occurred during this time. This value is saved.

From block 94, entry is made to question block 100 to determine if the current cycle is a plot cycle. The operation of the CPU 60 is carried out in alternating cycles. Every other cycle is a plot cycle and the remaining alternate cycles are data acquisition cycles. Thus, the CPU 60 alternates between executing data acquisition and plot cycles. If the CPU 60 is in a plot cycle, the YES exit is taken from block 100 to block 102 wherein previously stored data for the liquid level channel and the collar channels are printed on a strip chart by operation of the print head 64. Upon completion of these operations, the CPU 60 transfers to the exit interrupt block 104. The next cycle will be a data acquisition cycle.

Figure 3:
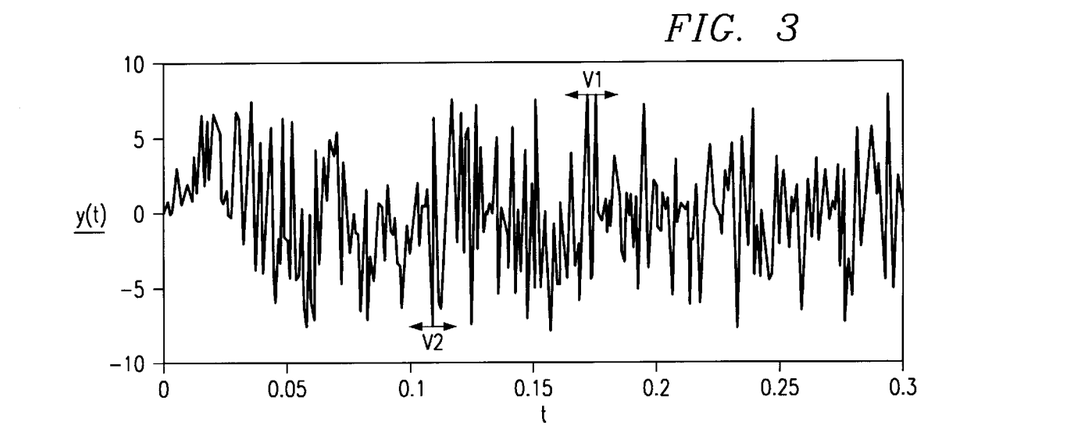
FIG. 3 is an illustration of a background noise signal.

If the CPU 60 is in a data acquisition cycle, the NO exit is taken from block 100 to question block 106. If the CPU 60 is in the time between time points $t_1$ and $t_2$, measurements are being made for the background noise. If this is occurring, the YES exit is taken to a block 108 wherein the gain needed for amplifier 28 is determined for producing an output signal having a predetermined level, such as a peak-to-peak distance of approximately ⅛ inch for the strip chart record which has a width of approximately one inch. The gain needed to produce this output for the noise signal is recorded. This is termed $G_{max}$. An example of such a noise signal is shown in FIG. 3 wherein the maximum range is between a value of +10 millivolts and −10 millivolts. The peak-to-peak difference is measured between the levels shown as V1 and V2. The following formula is used to calculate the background noise gain wherein the peak-to-peak printed signal is approximately ⅛" on the 1" wide chart. This desired amplitude is $Vd_{pp}$.

$$\text{GAIN} = \frac{2048}{40}\left(20\log\left(\frac{Vd_{pp}}{V_{pp}}\right) + 40\right)$$

After this gain calculation is performed during the noise measurement phase, exit is made from block 108 to the exit interrupt block 104.

Once the AGC routine has been started in block 126, entry is made to block 122 to set the gains for the current data samples. Transfer is then made to the exit interrupt block 104.

If the CPU 60 is not in the noise measurement phase, the NO exit is taken from block 106 to a block 116 which inquires to determine if the shot has been detected. The detection of the shot through the shot break channel has been previously described. The time $t_3$ is designated for the detection of the shot. If the shot has not been detected, the NO exit is taken from block 116 for a block 118 which inquires to determine if a manual gain setting has been made for the collars and liquid level channels. The collar channel gain is set by potentiometer 48 through line 50 to the converter 38. If the setting is below a predetermined value, this indicates that automatic gain is to be used, and if it is above this value, the value of the gain control potentiometer signal becomes the gain for the corresponding amplifier. This is done through the YES exit to block 120. If the manual gain settings are used to control the gain of amplifiers 28 and 30, exit is then made from block 120 where the gains are set for these amplifiers in block 122, and transfer is then made to the exit interrupt block 104.

If the manual gain has not been set, exit is made through the NO exit of block 118 to a block 124 wherein the CPU designates the use of automatic gain and this gain value is used for the samples received in the previous cycle in step 122 and transfer is then made to the exit interrupt 104. The amplitude of automatic gain is determined by reference to the peak amplitude of the output signals received during the preceding 100 millisecond time period. This peak value is compared to a reference values representing the desired amplitude range for the output signal. This reference value is approximately six times greater than the desired signal level for the noise. Thus, for a one inch wide strip record, this is a signal level having a span of approximately ¾ of an inch. The change in gain during the AGC cycle is determined by reference to a look-up table. The previously detected peak, during the last 100 milliseconds of output data, is compared on a 128 step scale to a maximum value of 128. If the value is between 0 and 7, the existing gain is increased by 5 db. If it is between 8 and 15, it is increased by 4 db. If it is between 16 and 23, the gain is increased by 3 db. Note that as the peak amplitude becomes greater, the amount of gain increase becomes less. If the peak amplitude is between 32 and 47, there is a 2 db increase in gain. If the amplitude is between 48 and 71, there is a 1 db increase in gain. For the range from 72 to 87, there is no change in gain. For the range between 88 and 111, there is a 1 db decrease in gain. For the range between 112 and 128, there is a 2 db decrease in gain. This information is stored in a look-up table.

The upper and lower limits on change could be equal and therefore work as a preset threshold.

During the AGC operations after $t_5$, the maximum gain applied to amplifier 28 is limited to the gain value $G_{max}$ determined for the background noise. Thus, when the amplifier 28 has its maximum allowed gain after $t_5$ the noise signal has an amplitude of ⅛".

If the YES exit is taken from block 116, this indicates that the time point $t_3$ has occurred. This causes the AGC routine to be implemented as shown in block 126. Referring to FIG. 4, this routine comprises fixing the gain of the collars channel amplifier 28 at a predetermined level during the time period from $t_3$ to $t_4$. This is approximately a time of 1–20 milliseconds. At time $t_4$, the gain is ramped upward uniformly until time $t_5$. This is for approximately 100–200 milliseconds. After time $t_5$, the AGC routine uses the look-up table described above to determine the change in gain.

FIG. 5 is an illustration of an initial print-out produced by the CPU 60 for evaluation of a particular well. The operator writes in the requested information on the strip chart. The information includes the well name, the casing pressure, production rate, joints to liquid, distance to liquid, production rate efficiency, maximum production and other information. This print-out further includes the peak-to-peak voltage of the background noise on the collar channel, the gain of the collar's channel amplifier and the filter selected, which is the lower frequency filter for lower collar responses. There is further included the noise level for the liquid level channel, and the gain for the liquid level amplifier.

The initial print-out further includes the system voltage, which is 11.5 volts and includes the statement that the system is prepared for the operator to "generate pulse". this refers to the acoustic pulse which is transmitted down the well bore.

FIG. 6 is an illustration of the actual data received from a well. This is a dual track chart recording in which the lower strip is a continuation of the upper strip. Time markers (vertical dotted lines) are marked on the response. These one second marks extend from zero to eleven. The upper channel represents the collar channel signal and each cycle represents a collar reflection. The process of producing one cycle of signals for each collar is described in detail in U.S. Pat. No. 5,200,894, which is incorporated herein by reference. This particular chart has marked on it a count of the number of collar reflections. It is shown to be 136 joints to the liquid. The liquid response is labeled "downward kick". As shown in FIG. 5, this calculates to be a distance of 4,216 feet from the surface to the liquid level.

In operation, the user of the instrument 20 turns on the device which causes an initial header to be printed on the strip chart. Then the operator turns on the chart drive and the instrument 20 immediately measures the background noise as indicated in the time interval from $t_1$ to $t_2$ in FIG. 4. This establishes a gain value $G_{max}$ for the amplifier 28 to produce a desired amplitude of background noise for the strip chart record. Simultaneously, the instrument 20 then prints the information header shown in FIG. 5 which concludes with the instruction to the operator to "generate pulse".

The operator can then produce the acoustic pulse by either manually firing a gun or electrically firing an acoustic gun. The instrument 20 then monitors to detect the occurrence of the acoustic pulse and this occurs in the logic flow in FIG. 2 beginning with block 86. This is done through monitoring the shot break channel with amplifier 26. When the amplitude in this channel exceeds the predetermined threshold, this is a designation of the time $t_3$ as shown in FIG. 4. The instrument 20 then applies a fixed level of gain to the collar's channel as shown in the time interval from $t_3$ to $t_4$. Next, the gain is slowly ramped upward during the interval from $t_4$ to $t_5$. After $t_5$, the automatic gain control calculates by use of the look-up table above, the required amplitude level to produce an output signal on the strip chart having the desired size. This is usually about 6 times greater than the preselected amplitude for the background noise. However, in no case is the amplifier 28 in the collar's channel allowed to have a gain greater than that previously measured for the background noise during the interval $t_1$–$t_2$. As shown in FIG. 6, during the time between the 1 and 5 second markers, the collar response amplitude is essentially constant, but it falls off as the 7 second marker is met. This indicates that the amplifier 28 has been driven to its maximum value allowed.

An important aspect of the measurement of the background noise is that there is a substantial variation in the amplitude of such noise from one well to the next. This is principally based upon the amount of gas being produced by the well. When there is very little gas bubbling through the liquid, the noise level is lower, but if a large volume of gas is bubbling up through the liquid, a substantial amount of noise can be produced.

The instrument 20, by measuring this noise prior to any shot, conditions the size of the noise signal to always have approximately the same size on the strip chart record, without requiring any intervention by the operator. This assures that the desired information is best shown.

Figure 7:
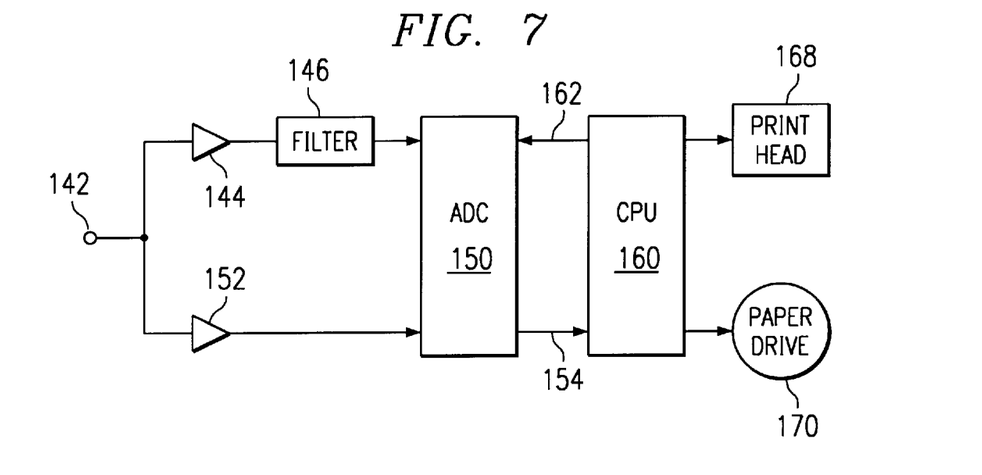
FIG. 7 is a block diagram of a second embodiment of the present invention.

A further embodiment of the present invention is illustrated in FIG. 7 as instrument 140. An input terminal 142, coupled to a microphone as described above, is connected through a fixed gain amplifier 144 and a filter 146 to an analog-to-digital converter 150. The converter 150 is preferably a model 048-7340-702 manufactured by Analog Devices. The converter 50 has a 22 bit resolution and a preferred sampling rate of 500 samples per second. It is a 4 channel device.

The input terminal 142 is connected through a fixed gain amplifier 152 to a further input of the converter 150.

The digital samples produced by the converter 150 are transmitted through a line 154 to a central processing unit 160 which is preferably an Intel model 048-8790-204. The control signals from the CPU 160 are transmitted through a line 162 to the converter 150. The CPU 160 drives a printhead 168 and a paper drive 170.

The filter 146 is preferably a high pass filter which has a 10 Hz roll off.

Figure 8:
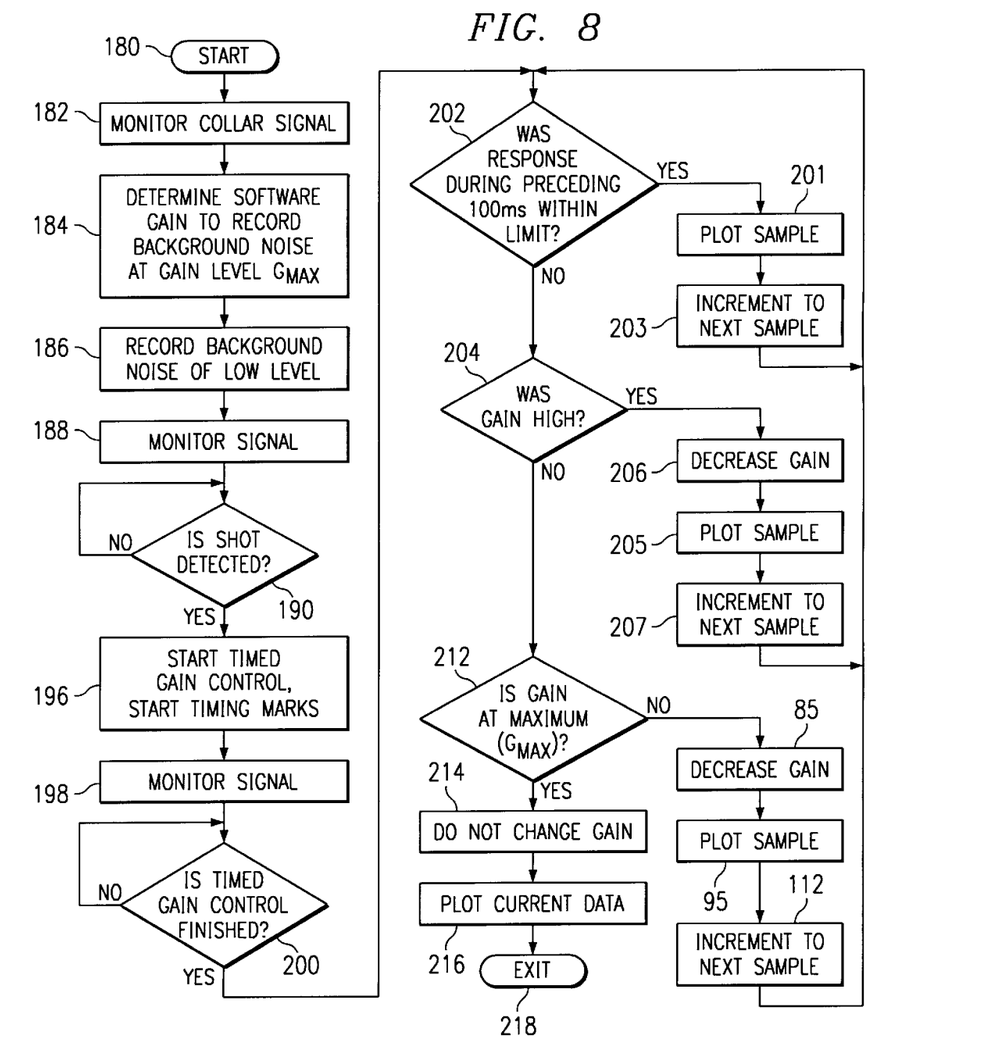
FIG. 8 is a flow diagram illustrating the operation of the instrument shown in FIG. 7.

The operation of the instrument 140 is described in the flow diagram shown in FIG. 8 and the waveform shown in FIG. 4. The instrument 140 does not have a variable gain amplifier as does the instrument 20 described above, but instead utilizes variable gain within software for the digital data. The digitized input data, the detection signal, is amplified to produce the output signal which is printed on the strip chart.

The collar channel information is transmitted through the amplifier 144 and filter 146 while the liquid level signal is conveyed through the amplifier 152. The converter 150 is preferably operated at a sample rate of 1 KHz.

Software operations began with an entry at start 180. In block 182, the system monitors the collar signal which is transmitted through amplifier 144.

At block 184, the CPU 160 receives the background noise, such as during the time period $t_1$ to $t_2$, as shown in FIG. 4, and determines the maximum gain ($G_{max}$) necessary to record the background signal at a predetermined level, which is preferably about ⅛" wide on a 1" scale.

From block 184, entry is made to block 186 wherein the background noise is recorded at the predetermined level such as shown for the output signal in FIG. 4 between the times $t_2$ to $t_3$.

In block 188, the operation continues with monitoring the collar signal received through amplifier 144.

In question block 190, an examination is made to determine if the shot has been detected. This is the acoustic pulse. Detection is determined by comparing the amplitude of the received signal to a predetermined threshold. If this threshold has been exceeded, it is designated that the shot has been received. This designates the time point $t_3$. If the NO exit is taken from block 190, the system continues to examine for detection of the shot. If the shot has been detected, the YES exit is taken from block 190 to block 196. Within block 196 a timed gain control is started. This comprises setting an initial gain for the system which continues for a fixed period of time which may range from one to twenty milliseconds, such as shown in the interval from $t_3$ to $t_4$. Also in block 196, initiation of timing mark generation is begun.

Entry is made to block 198 from block 196 to continue monitoring the received collar signal.

From block 198 entry is made to block 200 to determine if the timed gain control has finished. If this is not timed out, the NO exit is taken to continue this examination. If it has timed out, the YES exit is taken to question block 202. In block 202, an examination is made for the data produced during the last 100 ms for the collar channel to determine if the peak was within the allowable limits as set forth in the lookup table, described above. The 100 ms time is a sliding window for the output data. If the peak is within the desired limits, the YES exit is taken to plot the current output sample amplified with the current gain in block 201. Next, there is an increment to the next sample in block 203 and then to block 202 to continue for examination of the next received data signal. If the NO exit is taken, entry is made to the question block 204. Within block 204, an examination is made to determine if the previously stored gain was too high, that is, the peak of the amplified signal is at an amplitude that was in excess of the limit allowed as set forth in the lookup table. If the answer to the question in block 204 is YES, entry is made to block 206 wherein the current gain is decreased in accordance with the lookup table. Transfer is made from block 206 to block 205 to plot the current output sample, which is the input sample amplified by the current gain, then to block 207 to increment to the next sample. Next is a return back to block 202 for another determination of the peak of the amplified output signal. If the NO exit is taken from block 204, entrance is made to question block 212.

Within block 212, an examination is made to determine if the present gain setting is equal to the maximum allowable gain $G_{max}$. If not, this indicates that the presently set gain did not bring the peak of the output signal within the desired range. Entry is therefore made through the NO exit to the block 208 wherein the gain is increased in accordance with the lookup table. After block 208, the current output sample is plotted in block 209 and increment is made to the next sample in block 211. Transfer is then made back to the input of the question block 202.

If the gain has reached the maximum allowed, as set forth in block 212, the YES exit is taken to block 214 which indicates that there is no change in gain followed by exit in block 216. Operations are then resumed by a clock interrupt to reenter the startblock 180.

In operation, the instrument 140 monitors the collar signal channel, through amplifier 144, and determines the amplitude of the background noise and further calculates the maximum gain factor ($G_{max}$) necessary to produce a desired low level of noise response, such as ⅛" inch on a strip chart. This value is saved. Next, the system awaits detection of the acoustic pulse, which can be generated automatically or by an operator. When this shot is detected, the system applies a predetermined gain for a short period of time to limit the response of the system to the very strong direct acoustic pulse. After this has been completed, the system begins monitoring the received collar channel signal and performing the automatic gain control function. This function is done in conjunction with the lookup table previously described. The digitized input signal received at CPU 160 is amplified by a gain factor which is initially set and then incrementally modified. An examination is made for the data received during the preceding 100 milliseconds to detect the peak value of the signal within that range. It is this peak value that is input into the lookup table to determine whether the current sample will use the existing gain value or an increased or decreased gain value. When this is determined by reference to the lookup table, the current input sample is multiplied by this gain factor and then plotted by use of the printhead and paper drive.

By use of this method of operation, in particular measuring the background noise before the start of plotting, it is unnecessary for an operator to make a selection for a gain factor for the instrument. The desired output amplitude for high level signals, after the shot, is approximately ¾" on a 1" wide chart. The automatic gain control function drives the output signal to approximately this amplitude for so long as the amplification factor does not exceed $G_{max}$. When this gain factor is reached, there is no further increase in the gain, but the chart then shows the background noise, as essentially originally measured.

Figure 9:
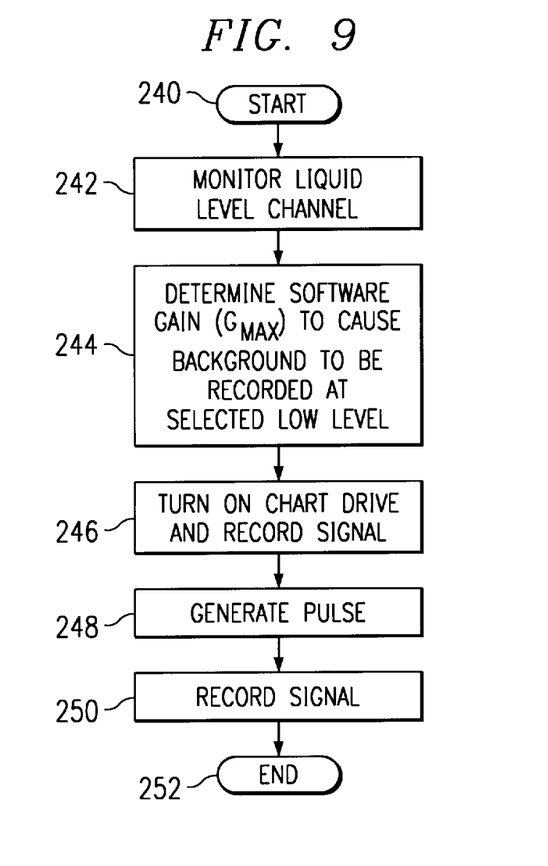
FIG. 9 is a flow diagram illustrating the operation of the instrument for recording the liquid level channel.

The operation of the instrument 144 for recording the liquid level channel, which is the signal passed through amplifier 152, is described in reference to FIG. 9.

The operation of the instrument is begun with start block 240 wherein the device is activated by the operator. The first step in block 242 is to monitor the liquid level channel, that is, to receive data through amplifier 152, which is digitized by converter 150 and provided through line 154 to the CPU 160.

In block 244, the CPU 160 determines the software gain ($G_{max}$) necessary to cause the background noise to have a selected amplitude for recording on the strip chart. As described above, this is a response of approximately 1/8" on a 1" wide strip chart. This value $G_{max}$ is set as the fixed software gain for this channel.

Next, in block 246, the chart drive is turned on and the liquid level channel signal received through amplifier 152 is received and recorded on the strip chart.

In block 248, the acoustic pulse is generated either by command from the instrument 140 or by manual action of the operator. There is no gain alteration made in this signal channel recording.

In block 250, the data received on the liquid level channel is recorded, after being amplified according to the value of $G_{max}$. This process is continued until the instrument operation is terminated at the end block 252.

In recording the liquid level channel, there is no change in gain after the background noise gain $G_{max}$ is set. The last signal response, termed the kick, represents the reflection from the liquid surface.

The channels can be implemented in software in the same manner as done for instrument 20 in FIG. 1 to accentuate the collar response.

Although several embodiments of the invention has been illustrated in the accompanying drawings and described in the foregoing Detailed Description, it will be understood that the invention is not limited to the embodiment disclosed, but is capable of numerous rearrangements, modifications and substitutions without departing from the scope of the invention.

What is claimed is:

1. A method for collecting acoustic data produced in response to the transmission of an acoustic pulse down a borehole in the earth, comprising the steps of:
    monitoring the acoustic environment within said borehole to produce a detection signal,
    applying a variable gain to said detection signal to produce an output signal,
    prior to the generation of said acoustic pulse, monitoring background noise in said borehole as said detection signal and selecting a first gain value for application to said detection signal to produce said output signal to have a first predetermined amplitude,
    detecting the occurrence of said acoustic pulse in said detection signal, and
    after detecting said occurrence of said acoustic pulse, increasing the gain applied to said detection signal when an amplitude related to a preceding portion of said output signal is less than a first limit, and decreasing the gain applied to said detection signal when an amplitude related to a preceding portion of said output signal is more than a second limit, but limiting the gain applied to said detection signal to not exceed said first gain value.

2. A method as recited in claim 1 wherein said first and second limits are equal.

3. A method as recited in claim 1 wherein said amplitude in a preceding portion of said output signal is a peak value.

4. A method as recited in claim 1 including the step of printing said output signal on a strip chart.

5. A method for collecting acoustic data produced in response to the transmission of an acoustic pulse down a borehole in the earth, comprising the steps of:
    monitoring the acoustic environment within said borehole to produce a detection signal,
    prior to the generation of said acoustic pulse, monitoring background noise in said borehole as said detection signal and selecting a first gain value for application to said detection signal to produce an output signal which has a predetermined amplitude, and
    after generation of said acoustic pulse, applying said first gain value to said detection signal to produce said output signal.

6. A method as recited in claim 5 including the step of printing said output signal on a strip chart.

7. A method as recited in claim 5 wherein said predetermined amplitude is a low level response.

8. A method for collecting acoustic data produced in response to the transmission of an acoustic pulse down a borehole in the earth, comprising the steps of:
    monitoring the acoustic environment within said borehole to produce a detection signal,
    digitizing said detection signal to produce a sequence of digital input samples,
    applying a variable gain to said digital input samples to produce an output signal comprising digital output samples,
    prior to the generation of said acoustic pulse, monitoring background noise in said borehole as said detection signal and selecting a first gain value for application to said digital input samples to produce digital output samples comprising said output signal which has a first predetermined amplitude,
    detecting the occurrence of said acoustic pulse in said detection signal, and
    after detecting said occurrence of said acoustic pulse, increasing the gain applied to one or more current digital input samples to produce said digital output samples when an amplitude related to a preceding group of said digital output samples is less than a second predetermined amplitude, and decreasing the gain applied to one or more current digital input samples when an amplitude related to a preceding group of said digital output samples is more than a third predetermined amplitude, but limiting the gain applied to said digital input samples to not exceed said first gain value.

9. A method as recited in claim 8 wherein said second and third predetermined amplitudes are equal.

10. A method as recited in claim 8 wherein said amplitude related to a preceding group of said digital output signals is a peak value.

11. A method as recited in claim 8 including the step of printing said output samples on a strip chart.

12. A method for collecting acoustic data produced in response to the transmission of an acoustic pulse down a borehole in the earth, comprising the steps of:

monitoring the acoustic environment within said borehole to produce a detection signal, digitizing said detection signal to produce a sequence of digital input samples, prior to the generation of said acoustic pulse, monitoring background noise in said borehole as said detection signal and selecting a first gain value for application to said digital input samples to produce digital output samples comprising a digital output signal which has a predetermined amplitude, and after generation of said acoustic pulse, applying said first gain value to said digital input samples to produce said output signal.

13. A method as recited in claim 12 including the step of printing said output signal on a strip chart.

14. A method for collecting acoustic data produced in response to the transmission of an acoustic pulse down a borehole in the earth, comprising the steps of:

monitoring the acoustic environment within said borehole to produce a detection signal, applying said detection signal to the input of a variable gain amplifier which produces an output signal, prior to the generation of said acoustic pulse, monitoring background noise in said borehole as said detection signal and selecting a gain value for said amplifier to drive said output signal to a first predetermined amplitude, detecting the occurrence of said acoustic pulse in said detection signal, and subsequent to detecting the occurrence of said acoustic pulse, conducting for a plurality of cycles the process of:

detecting the amplitude of said output signal and increasing the gain of said variable gain amplifier when said detected amplitude of said output signal is less than a second predetermined amplitude, which is greater than said first predetermined amplitude, and decreasing the gain of said variable gain amplifier when said detected amplitude of said output signal is more than a third predetermined amplitude, but limiting the gain of said variable gain amplifier to not exceed said gain value.

15. A method for collecting acoustic data as recited in claim 14 wherein the step of detecting the amplitude of said output signal comprises detecting the peak amplitude of said output signal during a preceding time interval.

16. A method for collecting acoustic data as recited in claim 14 including the step of printing a representation of said output signal on a strip chart.

17. A method for collecting acoustic data produced in response to the transmission of an acoustic pulse down a borehole in the earth, comprising the steps of:

monitoring the acoustic environment within said borehole to produce a detection signal, applying said detection signal to the input of a variable gain amplifier which produces an output signal, prior to the generation of said acoustic pulse, monitoring background noise in said borehole as said detection signal and selecting a first gain value for said amplifier to drive said output signal to a first predetermined amplitude, detecting the occurrence of said acoustic pulse in said detection signal, subsequent to detecting the occurrence of said acoustic pulse, setting the gain of said variable gain amplifier to a second gain value and maintaining the second gain value for a first predetermined period of time, upon expiration of said first predetermined period of time, increasing the gain of said variable gain amplifier over a second predetermined period of time to a third gain value, which is greater than said first gain value and less than said first gain value, and upon expiration of said second predetermined period of time, conducting for a plurality of cycles the process of:

detecting the amplitude of said output signal and increasing the gain of said variable gain amplifier when said detected amplitude of said output signal is less than a second predetermined amplitude, which is greater than said first predetermined amplitude, and decreasing the gain of said variable gain amplifier if said detected amplitude of said output signal is more than a third predetermined amplitude, but limiting the gain of said variable gain amplifier to not exceed said first gain valve.

18. A method for collecting acoustic data as recited in claim 17 wherein the step of detecting the amplitude of said output signal comprises detecting the peak amplitude of said output signal during a time interval.

19. A method for collecting acoustic data as recited in claim 17 including the step of printing a representation of said output signal on a strip chart.

20. A method for collecting acoustic data produced in response to the transmission of an acoustic pulse down a borehole in the earth, comprising the steps of monitoring the acoustic environment within said borehole to produce a detection signal, applying said detection signal to the input of a variable gain amplifier which produces an output signal, digitizing said output signal to produce a series of digital samples, prior to the generation of said acoustic pulse, monitoring background noise in said borehole as said detection signal and selecting a first gain value for said amplifier to drive said output signal to a first predetermined amplitude, detecting the occurrence of said acoustic pulse in said detection signal, and subsequent to detecting the occurrence of said acoustic pulse, conducting for a plurality of cycles the process of:

detecting the amplitude of said output signal digital samples and increasing the gain of said variable gain amplifier when said detected amplitude of said output signal is less than a second predetermined amplitude, which is greater than said first predetermined amplitude, and decreasing the gain of said variable gain amplifier if said detected amplitude of said output signal is more than a third predetermined amplitude, but limiting the gain of said variable gain amplifier to not exceed said first gain value.

21. A method for collecting acoustic data as recited in claim 20 wherein the step of detecting the amplitude of said output signal comprises detecting the peak amplitude of one of said digital samples within a sequential group of said samples of said output signal.

22. A method for collecting acoustic data as recited in claim 20 including the step of printing a representation of said output signal on a strip chart.

23. A method for collecting acoustic data as recited in claim 22 including the step of printing timing marks on said strip chart.

UNITED STATES PATENT AND TRADEMARK OFFICE
CERTIFICATE OF CORRECTION

PATENT NO. : 6,014,609
DATED : January 11, 2000
INVENTOR(S) : James N. McCoy

It is certified that error appears in the above-identified patent and that said Letters Patent is hereby corrected as shown below:

Title page,
Item [76] Inventor, in the address, delete "Wichcita", and insert -- Wichita --.

Column 12, claim 17,
Line 17, delete "variable".

Signed and Sealed this

Twenty-sixth Day of February, 2002

*Attest:*

JAMES E. ROGAN
*Attesting Officer*   *Director of the United States Patent and Trademark Office*